(12) United States Patent
Nakamura et al.

(10) Patent No.: US 10,288,006 B2
(45) Date of Patent: May 14, 2019

(54) METAL GASKET AND MANUFACTURING METHOD THEREFOR

(71) Applicant: NOK CORPORATION, Tokyo (JP)

(72) Inventors: Yuji Nakamura, Makinohara (JP); Nobutake Matsuki, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/395,040

(22) PCT Filed: Apr. 15, 2013

(86) PCT No.: PCT/JP2013/061144
§ 371 (c)(1),
(2) Date: Oct. 16, 2014

(87) PCT Pub. No.: WO2013/161596
PCT Pub. Date: Oct. 31, 2013

(65) Prior Publication Data
US 2015/0069720 A1    Mar. 12, 2015

(30) Foreign Application Priority Data

Apr. 27, 2012 (JP) .................................. 2012-102392

(51) Int. Cl.
*B21D 22/02* (2006.01)
*B21D 35/00* (2006.01)
(Continued)

(52) U.S. Cl.
CPC .............. *F02F 11/00* (2013.01); *B21D 22/02* (2013.01); *B21D 35/001* (2013.01);
(Continued)

(58) Field of Classification Search
CPC .... B21D 22/02; B21D 35/001; F01N 13/1827
See application file for complete search history.

(56) References Cited

U.S. PATENT DOCUMENTS 4,813,687 A    3/1989 Nakayama et al.
5,022,664 A *  6/1991 Kitada ................. F16J 15/0818
                                                    123/41.09

(Continued)

FOREIGN PATENT DOCUMENTS

JP    H08-14394 A    1/1996
JP    H08-93918 A    4/1996
(Continued)

*Primary Examiner* — Vishal A Patel
*Assistant Examiner* — Thomas L Neubauer
(74) *Attorney, Agent, or Firm* — Harness, Dickey & Pierce, P.L.C.

(57) ABSTRACT

Provided is a metal gasket, which is capable of limiting localized decreases in contact pressure of the seal bead and of securing superior sealing over long periods. In order to achieve said purpose, the invention is a metal gasket, in which an opening that is open in the shape of the opening of the space to be sealed and a seal bead that extends along the perimeter of the opening are formed in a metal plate. The seal bead is one in which two or more portions from among half bead portions, fold-up bead portions and full bead portions are continuous with each other.

2 Claims, 10 Drawing Sheets

(51) Int. Cl.
*F02F 11/00* (2006.01)
*F16J 15/08* (2006.01)
*F01N 13/18* (2010.01)

(52) U.S. Cl.
CPC ......... *F02F 11/002* (2013.01); *F16J 15/0818* (2013.01); *F01N 13/1827* (2013.01)

(56) References Cited

U.S. PATENT DOCUMENTS

| | | | |
|---|---|---|---|
| 5,226,306 A | | 7/1993 | Yoshino et al. |
| 6,168,166 B1 | * | 1/2001 | Akimoto ............... F16J 15/0825 277/591 |
| 7,588,252 B2 | * | 9/2009 | Kasuya ................ F16J 15/0825 277/598 |
| 2003/0230858 A1 | * | 12/2003 | Matsuki ............... F16J 15/0818 277/594 |
| 2012/0153576 A1 | * | 6/2012 | Prehn ................. F01N 13/1827 277/595 |
| 2012/0153579 A1 | | 6/2012 | Nakaoka et al. |
| 2013/0276503 A1 | * | 10/2013 | Bronnhuber ......... B21D 35/001 72/332 |

FOREIGN PATENT DOCUMENTS

| | | |
|---|---|---|
| JP | H08-159284 A | 6/1996 |
| JP | H08-200058 | 8/1996 |
| JP | 2000-161494 A | 6/2000 |
| JP | 2004-052956 A | 2/2004 |
| JP | 2005-016380 | 1/2005 |
| JP | 2010-203512 A | 9/2010 |
| KR | 10-2013-0016804 A | 2/2013 |
| WO | WO-2011-024812 A1 | 3/2011 |

\* cited by examiner

METAL GASKET AND MANUFACTURING METHOD THEREFOR

CROSS-REFERENCE TO RELATED APPLICATIONS

This application is a U.S. National Stage Application of International Application No. PCT/JP2013/061144 filed on Apr. 15, 2013, and published in Japanese as WO 2013/161596 A1 on Oct. 31, 2013. This application claims priority to Japanese Application No. 2012-102392 filed on Apr. 27, 2012. The entire disclosures of the above applications are incorporated herein by reference.

BACKGROUND OF THE INVENTION

Field of the Invention

The present invention relates to a metal gasket which is used as a seal means of a joint portion between an exhaust manifold and an exhaust pipe of an internal combustion engine and a joint portion between a cylinder block and a cylinder head, and a manufacturing method of the metal gasket.

Description of the Conventional Art

A metal gasket which is used as a seal means of a joint portion between an exhaust manifold and an exhaust pipe of an internal combustion engine or between an intake manifold and an intake pipe is pinched between joint surfaces which faces to each other, and is structured such as to seal exhaust gas and air-fuel mixture of air and fuel by a seal bead which is bending formed so as to surround an opening portion which is open to the joint surface.

Here, in the case of the exhaust manifold and the intake manifold, an opening shape in the joint portion in relation to the exhaust pipe or the intake pipe is non-circular shapes (for example, a rectangular ring shape), and a metal gasket having a seal bead formed into a similar shape to the opening shape is used in this portion (refer, for example, to Japanese Unexamined Patent Publication No. 08-014394). However, the metal gasket tends to deform in a portion in which the seal bead extends linearly rather than a portion extending like a curve, when the metal gasket is exposed to a fastening load. Accordingly, there is a problem that leakage tends to be generated in the linear portion of the seal bead due to lack of surface pressure. In order to solve the problem mentioned above, it has been known to secure the necessary surface pressure by enlarging a width and a height of the seal bead in the portion in which the surface pressure short tends to be generated, thereby enhancing a rigidity (refer, for example, to Japanese Unexamined Patent Publication No. 08-159284).

SUMMARY OF THE INVENTION

Problem to be Solved by the Invention

However, according to the prior art, since a cross sectional shape itself of the seal bead is approximately the same, a range of the surface pressure which can be adjusted by changing the width or the height of the seal bead is small.

The present invention is made by taking the points mentioned above into consideration, and a technical object of the present invention is to provide a metal gasket which can secure an excellent sealing performance over a long period of time by suppressing partial reduction of the surface pressure of the seal bead.

Means for Solving the Problem

As a means for effectively solving the technical problem mentioned above, according to the invention of a first aspect, there is provided a metal gasket comprising:

a metal plate;

an opening portion which is provided like an opening shape of a space to be sealed;

a seal bead which extends along a periphery of the opening portion; and the opening portion and the seal bead being formed in the metal plate, wherein the seal bead is structured such that two or more portions among a portion constructed by a half bead, a portion constructed by a flip-up bead and a portion constructed by a full bead are connected to each other.

The term "half bead" here is a protruding shaped bead which forms an end edge of a ridge portion in an opening edge portion of the metal plate and is constructed by a one-side inclined surface, the flip-up bead is a protruding shaped bead which runs to the other inclined surface portion from one bottom portion via one inclined surface portion and the ridge portion, and the full bead is a protruding shaped bead which is formed like a chevron shape in its cross sectional shape, and runs to the other bottom portion from one bottom portion via one inclined surface portion, the ridge portion and the other inclined surface portion.

In the metal gasket having the structure described in the first aspect, spring constant of the seal bead when a fastening load is applied is higher in the portion constructed by the flip-up bead than in the portion constructed by the half bead, and is higher in the portion constructed by the full bead than in the portion constructed by the flip-up bead. As a result, in the case that the seal bead extends along a non-circular opening portion, surface pressure can be suppressed, for example, by constructing a portion in which the surface pressure rises on the basis of great curvature (small radius of curvature) of the seal bead, by the half bead, and reduction of the surface pressure can be suppressed by constructing a portion in which the surface pressure comes down on the basis of small curvature (great radius of curvature) of the seal bead, by the flip-up bead or the full bead. Therefore, it is possible to appropriately adjust the surface pressure.

According to the invention of a second aspect, there is provided a manufacturing method of a metal gasket comprising:

a step of forming a bead in a metal plate by a concave mold and a convex mold which are arranged in both sides in a thickness direction of the metal plate; and a step of forming an opening portion in the metal plate, the opening portion in which an opening edge goes through two or more of a ridge portion, an inclined portion and a bottom portion of the bead.

According to the invention of a third aspect, there is provided a manufacturing method of a metal gasket comprising:

a step of forming a bead in a metal plate by a concave mold and a convex mold which are arranged in both sides in a thickness direction of the metal plate; and a step of forming an opening portion in the metal plate, the opening portion in which an opening edge goes through two or more of a ridge portion, an inclined portion and a bottom portion of the bead, the two or more including the ridge portion, wherein the method previously forms a portion in which the opening edge goes through the ridge portion among the opening portion, before forming the bead.

According to the manufacturing method described in the second or third aspect, the bead formed in the metal plate by the concave mold and the convex mold comes to the half bead in the portion in which the opening edge of the opening portion passes through the ridge portion of the bead, comes to the flip-up bead in the portion in which the opening edge of the opening portion passes through the inclined surface portion of the bead, and comes to the full bead in the portion in which the opening edge of the opening portion passes through the bottom portion of the bead.

Effect of the Invention

On the basis of the metal gasket according to the invention of the first aspect, the spring constant of the seal bead greatly changes among the portion constructed by the half bead, the portion constructed by the flip-up bead and the portion constructed by the full bead. Therefore, an excellent sealing performance can be secured over a long period of time by suppressing dispersion of the surface pressure of the seal bead due to difference in curvature in the case that the seal bead extends non-circularly.

On the basis of the manufacturing method of the metal gasket according to the invention of the second or third aspect, it is possible to easily manufacture the metal gasket according to the invention of the first aspect.

BRIEF EXPLANATION OF THE DRAWINGS

FIGS. 2A and 2B are cross sectional views of a substantial part of the embodiment shown in FIG. 1, in which FIG. 2A is a cross sectional view along a line A-A in FIG. 1, and FIG. 2B is a cross sectional view along a line B-B in FIG. 1;

FIGS. 5A and 5B are cross sectional views of a substantial part of the convex mold shown in FIG. 4, in which FIG. 5A is a cross sectional view along a line A-A in FIG. 4, and FIG. 5B is a cross sectional view along a line B-B in FIG. 4;

FIGS. 7A and 7B are cross sectional views of a substantial part of the concave mold shown in FIG. 6, in which FIG. 7A is a cross sectional view along a line A-A in FIG. 6, and FIG. 7B is a cross sectional view along a line B-B in FIG. 6;

FIGS. 9A and 9B are cross sectional views of a substantial part of the forming step by the convex mold and the concave mold shown in FIG. 8, in which FIG. 9A is a cross sectional view along a line A-A in FIG. 8, and FIG. 9B is a cross sectional view along a line B-B in FIG. 8.

DETAILED DESCRIPTION OF PREFERRED EMBODIMENTS

Figure 1:
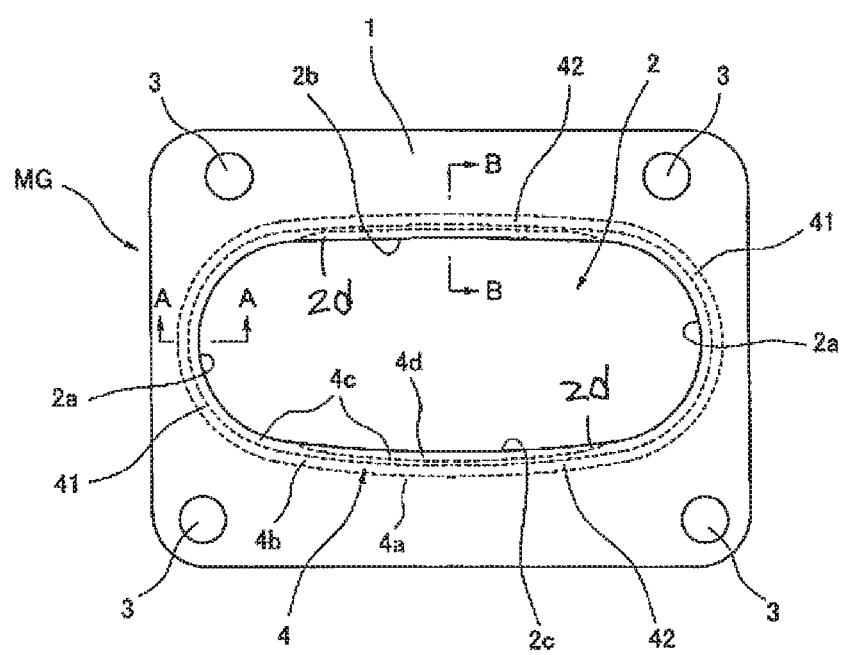
FIG. 1 is a plan view showing a preferable embodiment of a metal gasket according to the present invention.

A description will be given of preferable embodiments of a metal gasket and a manufacturing method of the metal gasket according to the present invention with reference to the accompanying drawings. First of all, FIG. 1 shows the preferable embodiment of the metal gasket according to the present invention, and the metal gasket MG is structured, for example, such as to be interposed between an exhaust manifold of an automotive internal combustion engine and a joint surface of an exhaust pipe.

The metal plate MG is structured such that a port hole portion 2 and a plurality of bolt insertion holes 3 are provided in a metal plate 1, and a seal bead 4 extending along a periphery of the port hole portion 2 is formed. The metal plate 1 is constructed by a thin plate which is selected from a stainless steel, a cold-rolled steel, a galvanized sheet iron and an aluminum alloy plate and has an elasticity. The bolt insertion holes 3 are arranged at a plurality of positions between the port hole portion 2 and an outer peripheral edge of the metal plate 1 and are provided for inserting bolts connecting an exhaust manifold and an exhaust pipe which are not shown.

The port hole portion 2 corresponds to the opening portion described in the first to third aspects, and is formed into a projection geometry of an exhaust gas passage which is constructed by the exhaust manifold and the exhaust pipe, in other words, an approximately oval shape obtained by projecting an opening shape of the exhaust gas passage which is open to joint surfaces of the exhaust manifold and the exhaust pipe. In more detail, an opening edge of the port hole portion 2 is constructed by a pair of semicircular arc shaped opening edges 2a, and a linear opening edge 2b and a gentle curve shaped opening edge 2c which extend between the semicircular arc shaped opening edges 2a. The gentle curve shaped opening edge 2c is structured such as to have much smaller curvature (greater radius of curvature) in comparison with the semicircular arc shaped opening edge 2a.

The seal bead 4 extending along the periphery of the port hole portion 2 is constructed by a half bead 41 in a portion which is along the semicircular arc shaped opening edge 2a, and is constructed by a flip-up bead 42 in a portion which is along the linear opening edge 2b and the gentle curve shaped opening edge 2c.

Figure 2A:
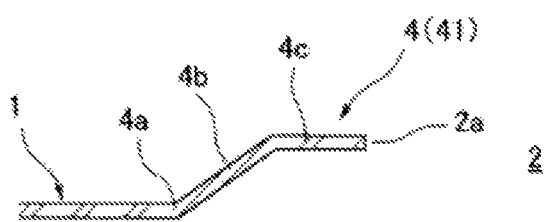
Figure 2B:
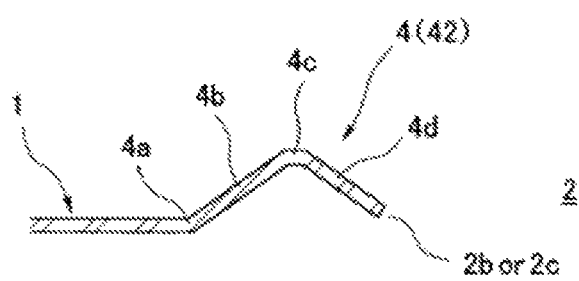

Among them, the half bead 41 is formed into a protruding shape which runs to a tabular ridge portion 4c from an outer peripheral bottom portion 4a via a diagonally uprising outer periphery inclined surface portion 4b, as shown in FIG. 2A showing a cross section along a line A-A in FIG. 1, and an end edge in an inner peripheral side of the ridge portion 4c comes to the semicircular arc shaped opening edge 2a in the port hole portion 2. Further, the flip-up bead 42 is formed into a protruding shape which runs to an inner periphery inclined surface portion 4d in an opposite side to the outer periphery inclined surface portion 4b via the outer periphery inclined surface portion 4b uprising diagonally from the outer periphery bottom portion 4a, and the ridge portion 4c which is bent like a convex shape to an upper side in an upper end of the outer periphery inclined surface portion 4b, as shown in FIG. 2B showing a cross section along a line B-B in FIG. 1, and an inner peripheral end edge of the inner periphery inclined surface portion 4*d* comes to the linear opening edge 2*b* or the gentle curve shaped opening edge 2*c* in the port hole portion 2 of the metal plate 1.

In a transition portion from the semicircular arc shaped opening edge 2*a* in the opening edge of the port hole portion 2 to the linear opening edge 2*b* or the gentle curve shaped opening edge 2*c* (a transition portion from the linear opening edge 2*b* or the gentle curve shaped opening edge 2*c* to the semicircular arc shaped opening edge 2*a*) 2*d*, the seal bead 4 continuously transits from the half bead 41 to the flip-up bead 42 (from the flip-up bead 42 to the half bead 41).

The metal gasket MG constructed as mentioned above is interposed, for example, between the exhaust manifold of the automotive internal combustion engine and the joint surface of the exhaust pipe singly or in a state in which a plurality of metal gaskets are laminated, the seal bead 4 is compression deformed by fastening the metal gasket MG, and the surface pressure required for sealing is obtained by a repulsive load, thereby preventing the exhaust gas from leaking from the portion between the joint surfaces.

In this kind of metal gasket, in the case that the shape of the seal bead 4 is non-circular such as the illustrated example, there is a tendency that the spring constant becomes higher in the portion having the great curvature (having the small radius of curvature) and the surface pressure becomes excessively high, and there is a tendency that the spring constant becomes lower inversely in the portion having the small curvature (having the great radius of curvature and being similar to a straight line) and lack of surface pressure tends to be generated. However, according to the metal gasket MG of the illustrated embodiment, since the portion along the semicircular arc shaped opening edge 2*a* having the great curvature is constructed by the half bead 41 among the seal bead 4, the surface pressure can be prevented from becoming excessively great. Further, since the portion along the linear opening edge 2*b* or the gentle curve shaped opening edge 2*c* having the small curvature is constructed by the flip-up bead 42, the surface pressure can be prevented from becoming excessively small.

Figure 3:
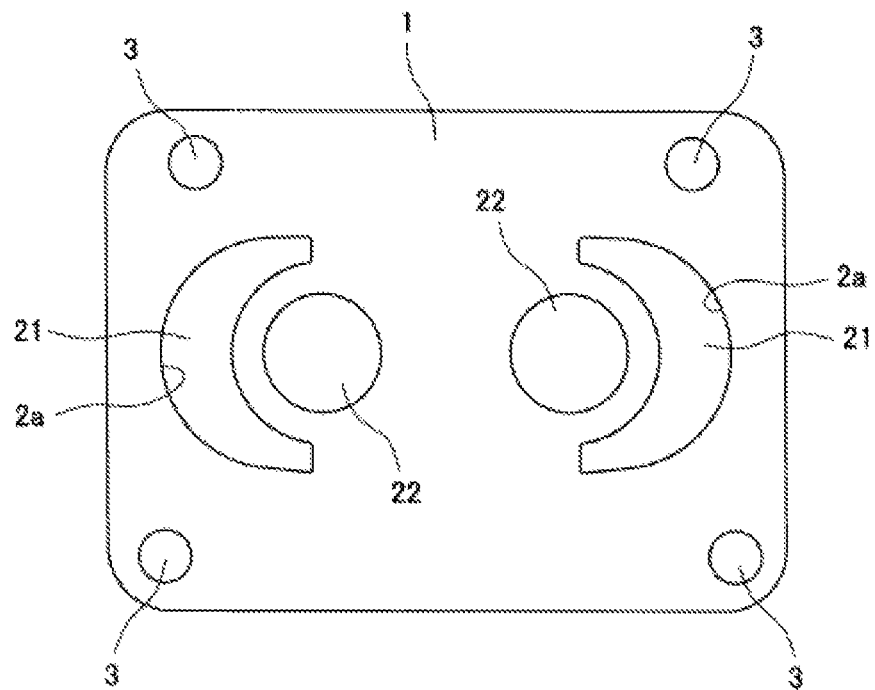
FIG. 3 is a plan view showing a state in which a preliminary hole coming to a part of a port hole portion is previously formed in a metal plate, in a preferable embodiment of a manufacturing method of a metal gasket according to the present invention.

FIGS. 3 to 10 show a method for manufacturing the metal gasket MG mentioned above according to a process sequence. In other words, in the manufacturing of the metal gasket MG, the process first of all forms the bolt insertion hole 3, a pair of preliminary holes 21 having a portion in which the opening edge comes to the semicircular arc shaped opening edge 2*a* in the port hole portion 2 in FIG. 1, and a pair of positioning holes 22, in the metal plate 1, as shown in FIG. 3. These elements can be formed by punching at the same time of punching an outer edge of the metal plate 1.

Figure 4:
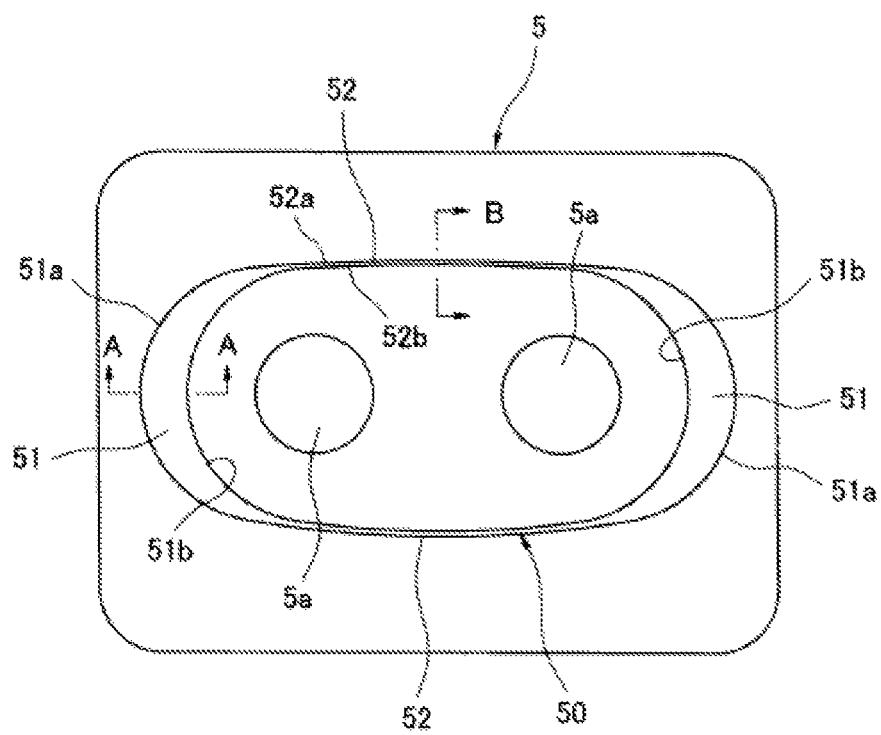
FIG. 4 is a top elevational view showing a convex mold which is used in the preferable embodiment of the manufacturing method of the metal gasket according to the present invention.
Figure 5A:
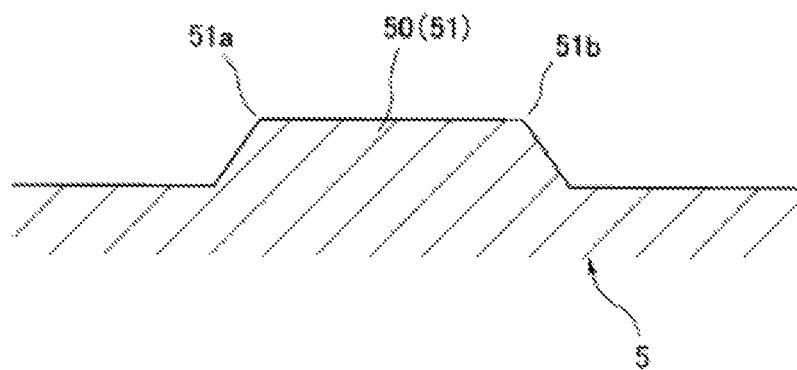
Figure 5B:
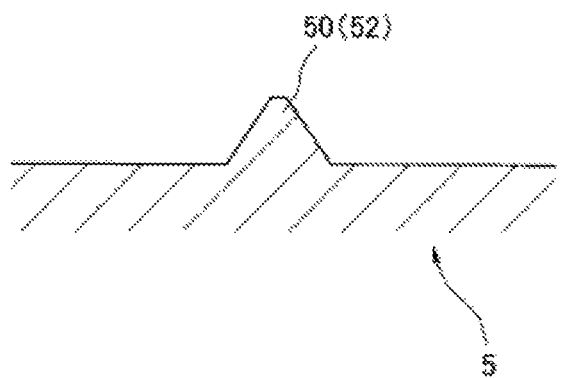

A convex mold 5 shown in FIG. 4 is structured such that a bead forming convex portion 50 and a plurality of positioning convex portions 5*a* are formed on its upper surface, the positioning convex portions 5*a* being provided for positioning and setting the metal plate 1 on the upper surface by being fitted to the positioning holes 22 of the metal plate 1. The bead forming convex portion 50 corresponds to the ridge portion 4*c* of the seal bead 4 shown in FIG. 1, and is constructed by a portion (hereinafter, refer to as a half bead forming convex portion) 51 which forms the half bead 41 and a portion (hereinafter, refer to as a flip-up bead forming convex portion) 52 which forms the flip-up bead 42, and the half bead forming convex portion 51 is formed to be wider than the flip-up bead forming convex portion 52 as shown in FIGS. 5A and 5B.

Further, in the bead forming convex portion 50 in the convex mold 5, the half bead forming convex portion 51 is formed into a crescent shape, an outer edge 51*a* thereof extends in correspondence to an outer edge of the ridge portion 41*c* of the half bead 41, that is, the outer edge 51*a* is formed so as to be positioned in an outer peripheral side of the preliminary hole 21 in the case that the metal plate 1 shown in FIG. 3 is set to the convex mold 5, and an inner edge 51*b* is on the contrary formed so as to pass through an inner side of the preliminary hole 21.

Figure 6:
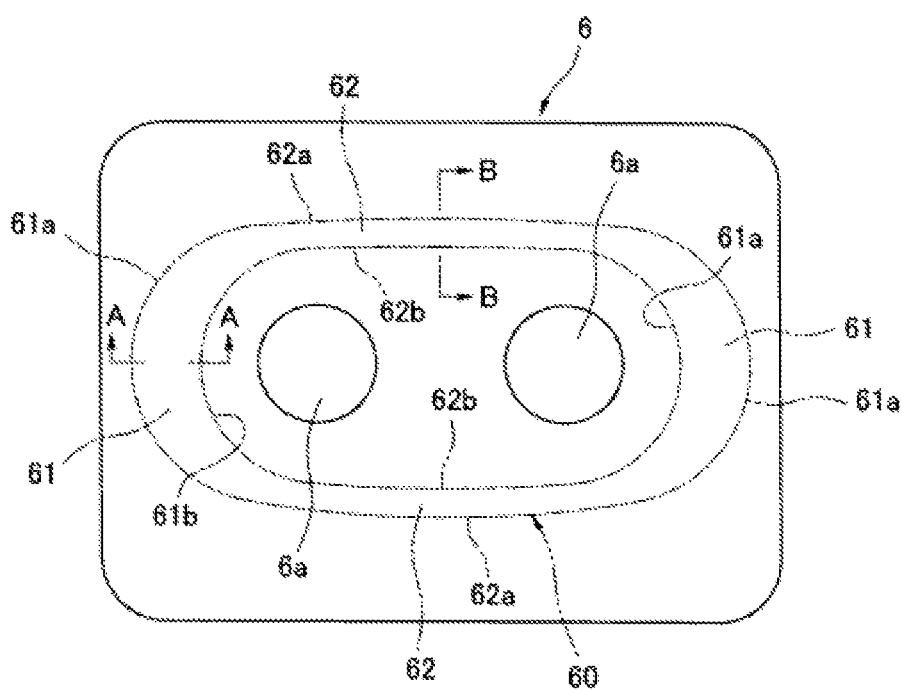
FIG. 6 is a bottom elevational view showing a concave mold which is used in the preferable embodiment of the manufacturing method of the metal gasket according to the present invention.
Figure 7A:
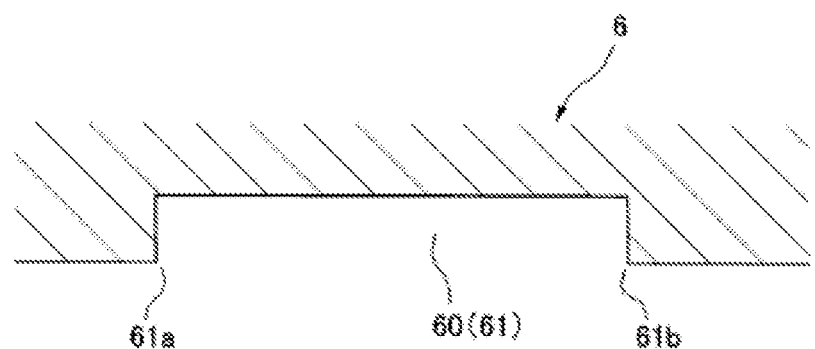
Figure 7B:
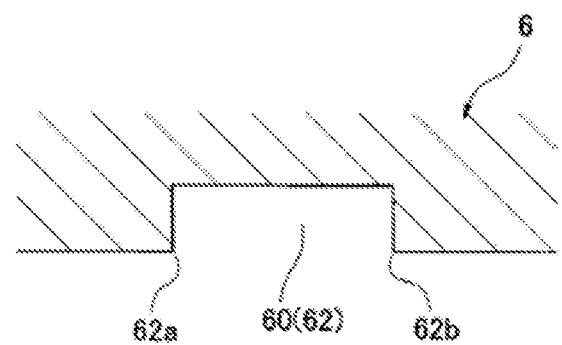

On the other hand, a convex mold 6 shown in FIG. 6 is structured such that a bead forming concave portion 60 is formed in its lower surface. Reference symbol 6*a* denotes a positioning concave portion or hole which can be fitted to the positioning convex portion 5*a* of the convex mold 5. The bead forming concave portion 60 is constructed by a portion (hereinafter, refer to as a half bead forming concave portion) 61 which formed the half bead 41 of the seal bead 4 shown in FIG. 1, and a portion (hereinafter, refer to as a flip-up bead forming concave portion) 62 which forms the flip-up bead 42, and the half bead forming concave portion 61 is formed to be wider than the flip-up bead forming concave portion 62, as shown in FIGS. 7A and 7B. Further, the half bead forming concave portion 61 is formed to be wider than the half bead forming convex portion 51 of the convex mold 5, and the flip-up bead forming concave portion 62 is formed to be wider than the flip-up bead forming convex portion 52 of the concave mold 5.

In more detail, an outer edge 61*a* of the hold bead forming concave portion 61 and an outer edge 62*a* of the flip-up bead forming concave portion 62 in the concave mold 6 are structured such as to extend in correspondence to the bottom portion 4*a* of the seal bead 4 shown in FIGS. 1 and 2, and are positioned closer to an outer peripheral side than the outer edge 51*a* of the half bead forming convex portion 51 and the outer edge 52*a* of the flip-up bead forming convex portion 52 in the convex mold 5, in the case of being combined with the convex mold 5. Further, an inner edge 61*b* of the half bead forming concave portion 61 and an inner edge 62*b* of the flip-up bead forming concave portion 62 in the concave mold 6 are positioned closer to an inner peripheral side than the inner edge 51*b* of the half bead forming convex portion 51 and the inner edge 52*b* of the flip-up bead forming convex portion 52 in the convex mold 5, in the case of being combined with the convex mold 5.

Figure 8:
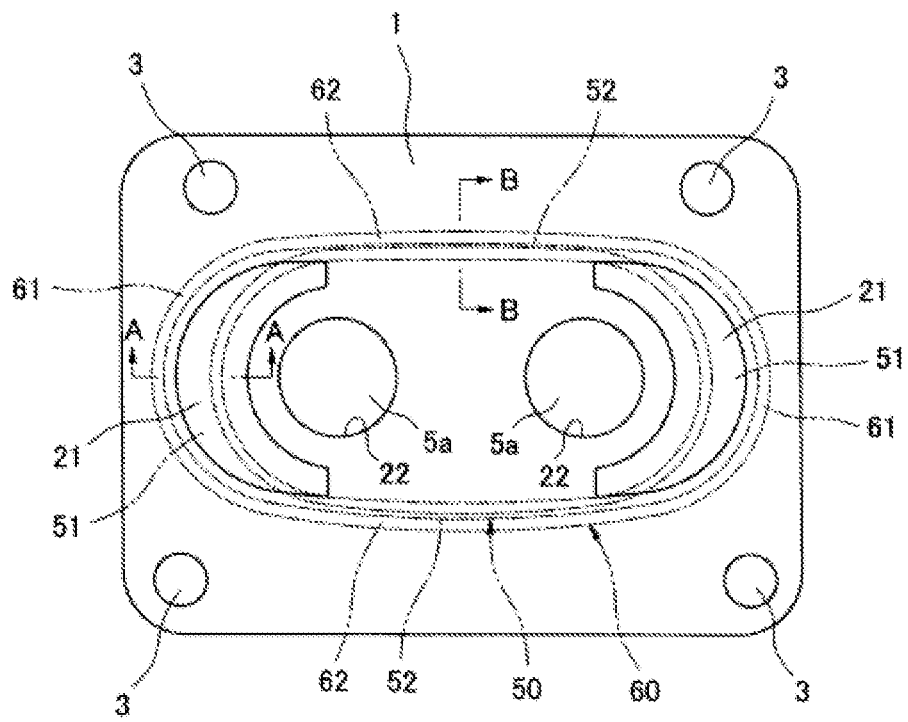
FIG. 8 is a plan view showing a step of forming a bead in the metal plate by the convex mold and the concave mold, in the preferable embodiment of the manufacturing method of the metal gasket according to the present invention.
Figure 9A:
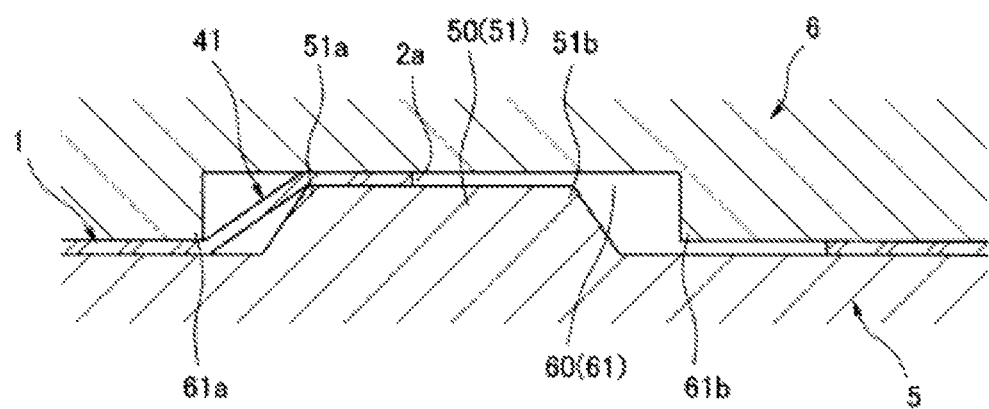
Figure 9B:
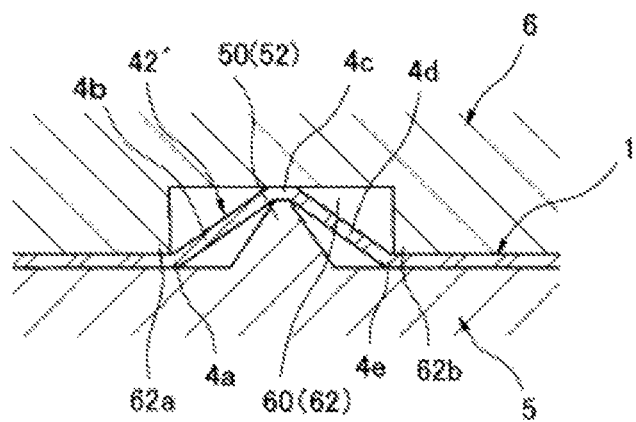

Next, in the case that the metal plate 1 shown in FIG. 3 is positioned and set between the convex mold 5 and the concave mold 6 so as to be press molded as shown in FIGS. 8 and 9, the metal plate 1 is bent only in the outer edge 51*a* of the half bead forming convex portion 51 and the outer edge 61*a* of the half bead forming concave portion 61 as shown in FIG. 9A, between the half bead forming convex portion 51 and the half bead forming concave portion 61 on the basis of existence of the preliminary hole 21. As a result, the half bead 41 is formed along the semicircular arc shaped opening edge 2*a* of the preliminary hole 21. On the other hand, since the preliminary hole 21 does not exist in the metal plate 1 between the flip-up bead forming convex portion 52 and the flip-up bead forming concave portion 62, the metal plate 1 is bent at three positions including the ridge portion of the flip-up bead forming concave portion 52, and the outer edge 62*a* and the inner edge 62*b* of the flip-up bead forming concave portion 62 as shown in FIG. 9B. As a result, a full bead 42' having a chevron cross sectional shape is formed.

Figure 10:
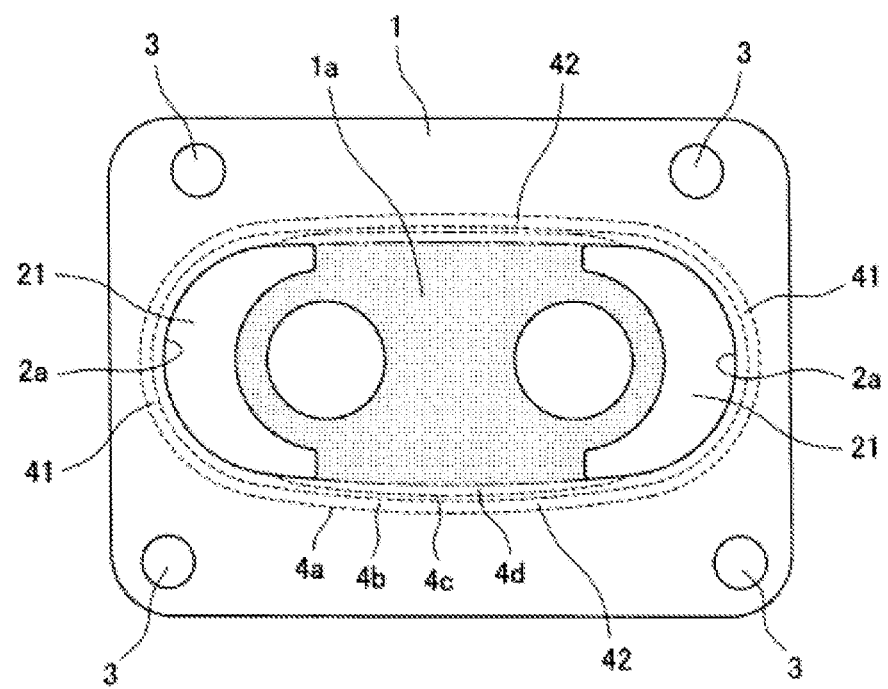
FIG. 10 is a plan view showing a step of forming a port hole portion in the metal plate according to a secondary processing, in the preferable embodiment of the manufacturing method of the metal gasket according to the present invention.

Next, the metal plate 1 in which the seal bead constructed by the half bead 41 and the full bead 42' is formed is cut as shown by a single-dot chain line in FIG. 10. In other words, an area (an area shown by hatching in FIG. 10) 1a surrounded by a pair of preliminary holes 21 and the full beads 42' and 42' is punched.

In this step, the port hole portion 2 is formed and the flip-up bead 42 is formed along the linear opening edge 2b and the gentle curve shaped opening edge 2c of the port hole portion 2, as shown in FIG. 1, by cutting the inner periphery inclined surface portion 4d in the full bead 42' shown in FIG. 9B at a position closer to a inner periphery bottom portion 4e, and the manufacturing of the metal gasket MG is finished.

Accordingly, it is possible to easily manufacture the metal gasket MG having the seal bead 4 in which the half beads 41 and the flip-up beads 42 are continuously provided, the half beads 41 being along the semicircular arc shaped opening edges 2a of the port hole portion 2, and the flip-up beads 42 being along the linear opening edge 2b and the gentle curve shaped opening edge 2c.

In the case that the inner periphery inclined surface portion 4d shown in FIG. 9B is cut by the inner periphery bottom portion 4e in the step of forming the port hole portion 2, it is possible to construct the portion of the flip-up bead 42 along the linear opening edge 2b and the gentle curve shaped opening edge 2c by the full bead. In addition, various changes can be employed, for example, the portion along the semicircular arc shaped opening edge 2a is constructed by the flip-up bead, in a relationship between shapes of the convex mold 5, and the bead forming convex portion and the bead forming concave portion of the concave mold 6, and a cutting position for forming the port hole portion 2.

What is claimed is:

1. A metal gasket comprising:
    a metal plate having a non-circular opening formed therethrough, the non-circular opening being defined along an entire perimeter thereof by an edge that, when the metal gasket is viewed in plan, includes first and third arc lengths that each have a large radius of curvature and second and fourth arc lengths that each have a small radius of curvature, the first arc length uninterruptedly being connected to the second arc length, the second arc length uninterruptedly being connected to the third arc length, the third arc length uninterruptedly being connected to the fourth arc length, and the fourth arc length uninterruptedly being connected to the first arc length; and
    a seal bead formed in the metal plate which extends along and is uniformly offset from an entire length of the edge that defines the non-circular opening,
    wherein the seal bead has a convex shape and is defined by:
    a half bead that extends along the first and third arc lengths of the edge that defines the non-circular opening; and
    a flip-up bead that extends along the second and fourth arc lengths of the edge that defines the non-circular opening,
    wherein the seal bead is defined by an outer peripheral bottom portion that is located distal from the non-circular opening and extends along the entire perimeter of the non-circular opening, and an outer periphery inclined surface portion that diagonally uprises from the first outer peripheral bottom portion in a direction toward the non-circular opening and extends along the entire perimeter of the non-circular opening,
    the half bead of the seal bead is defined by a first ridge portion that extends from the outer periphery inclined surface portion in a direction toward the non-circular opening and along the first and third arc lengths such that the first ridge portion defines the edge of the non-circular opening along the first and third arc lengths,
    the flip-up bead is defined by a second ridge portion that extends from the outer periphery inclined surface portion in a direction toward the non-circular opening and along the second and fourth arc lengths, and an inner inclined surface portion located proximate the non-circular opening, the inner inclined surface portion being opposite to the outer periphery inclined surface portion along the second and fourth arc lengths and diagonally falling from the second ridge portion in a direction toward the non-circular opening along the second and fourth arc lengths such that the inner inclined surface portion defines the edge of the non-circular opening along the second and fourth arc lengths, and
    wherein the first ridge portion uninterruptedly transitions into the second ridge portion and the inner inclined surface portion, and the uninterrupted transition of the first ridge portion into the second ridge portion and the inner inclined surface portion occurs where the first and third arc lengths uninterruptedly connect to the second and fourth arc lengths.

2. The metal gasket of claim 1, wherein the half bead continuously transitions into the flip-up bead in a direction that is parallel with the edge of the non-circular opening.

* * * * *